US005542512A

United States Patent [19]
Maehara

[11] Patent Number: 5,542,512
[45] Date of Patent: Aug. 6, 1996

[54] SELECTOR DEVICE FOR AN AUTOMATIC TRANSMISSION SYSTEM PROVIDED WITH LOCKING MEANS

[75] Inventor: Kazutaka Maehara, Saitama-ken, Japan

[73] Assignee: Honda Giken Kogyo Kabushiki Kaisha, Tokyo, Japan

[21] Appl. No.: 394,853

[22] Filed: Feb. 27, 1995

[30] Foreign Application Priority Data

Mar. 7, 1994 [JP] Japan ................................. 6-064674

[51] Int. Cl.⁶ ................................................. B60K 20/02
[52] U.S. Cl. .................. 192/4 A; 74/475; 74/473 SW; 74/483 K; 70/247
[58] Field of Search ............................ 192/4 A; 74/475, 74/473 SW, 483 R, 483 K; 70/245, 247

[56] References Cited

U.S. PATENT DOCUMENTS

| | | | |
|---|---|---|---|
| 3,434,315 | 3/1969 | Benedetto | 70/247 X |
| 3,942,614 | 3/1976 | Thompson | 192/4 A |
| 4,096,930 | 6/1978 | Viscardi | 192/4 A |
| 4,821,605 | 4/1989 | Dzioba | 192/4 A X |
| 4,936,431 | 6/1990 | Shinpo | 192/4 A |
| 4,955,935 | 9/1990 | Katayama | 192/4 A X |
| 4,981,048 | 1/1991 | Kobayashi et al. | 192/4 A X |
| 5,022,504 | 1/1991 | Kobayashi | 192/4 A |
| 5,025,678 | 6/1991 | Shinpo et al. | 74/473 SW |
| 5,027,931 | 7/1991 | Ratke et al. | 74/483 R X |
| 5,031,736 | 7/1991 | Kobayashi et al. | 192/4 A |
| 5,065,641 | 11/1991 | Yamamoto et al. | 74/473 SW |

FOREIGN PATENT DOCUMENTS 64-12920  1/1989  Japan .

*Primary Examiner*—Charles A. Marmor
*Assistant Examiner*—Saul Rodriguer
*Attorney, Agent, or Firm*—Skjerven, Morrill, MacPherson, Franklin & Friel; Thomas S. MacDonald

[57] ABSTRACT

In a selector device for an automatic transmission system, a rotatable member is supported by a first pivot shaft, and a selector lever is tiltably supported by the rotatable member by a second pivot shaft extending substantially perpendicularly to the first pivot shaft. A base end of the selector lever is bifurcated into a pair of engagement claws, and a checker cam is positioned in a gap defined between the engagement claws. A slide member can be slid into between the checker cam and the associated engagement claw to prevent the tilting movement of the selector lever. Thus, the slide member which is typically associated with a shift lock mechanism can prevent the tilting movement of the selector lever and, hence, the shifting of the selector lever from the P range position. Because the force applied to the selector lever is supported by the slide member as a compressive load, no substantial stress is applied to the actuator or the linkage provided between the actuator and the slide member. Therefore, various component parts forming the shift lock mechanism or otherwise associated with the movement of the slide member are not subjected to any large stress, and may consist of relatively small members.

7 Claims, 3 Drawing Sheets

SELECTOR DEVICE FOR AN AUTOMATIC TRANSMISSION SYSTEM PROVIDED WITH LOCKING MEANS

TECHNICAL FIELD

The present invention relates to a selector device for an automatic transmission system, and in particular to a selector device provided with an electric actuator for selectively enabling a shifting movement from a park range to a different range.

BACKGROUND OF THE INVENTION

A selector lever of an automatic transmission system is typically allowed to be shifted to any one of a number of ranges which, for instance, may include park (P), reverse (R), neutral (N), fourth drive (D4), third drive (D3), and second drive (2) ranges. In a typical stick shift arrangement, a selector lever projects upright from a floor panel, and can be freely shifted between N, D4 and D3 at will. However, in order to shift the selector lever between R and P, from N to P and from D3 to 2, it is necessary to push a release knob provided in the selector lever handle, and disengage a lock pin which normally engages a cam plate secured to a pivot center of the selector lever.

Also, a selector lever of an automatic transmission system is normally provided with a shift lock mechanism which allows the release knob to be depressed only when the brake pedal is pressed if the selector lever is in the park range. In other words, the shift lock mechanism prohibits the selector lever to be shifted from the park range unless the brake pedal is pressed. For instance, Japanese patent laid open publication No. 64-12920 discloses a typical shift lock mechanism.

In the case of a stick shift type selector lever, the shift lock mechanism is not required to have a very high mechanical strength because preventing the movement of the release knob is sufficient, and it does not require any strong force. However, in the case of a column shift type selector lever, no release knob is used, and the same function is accomplished by the pivoting or tilting movement of the selector lever in the axial direction of the steering column. In other words, when the vehicle operator wishes to move the selector lever, for instance, from the park range to the drive range, he pulls the grip handle of the selector lever toward him, and achieves the necessary releasing action. Therefore, the force applied by the vehicle operator to the selector lever will be magnified at the base end of the selector lever by a lever action, and a substantial mechanical strength would be required for the shift lock mechanism intended for prohibiting such a releasing movement of the selector lever.

However, a high mechanical strength of the shift lock mechanism is difficult to achieve because the entire assembly of the shift lock mechanism must be installed in a small mounting space allocated on the steering column. Any protrusion on the steering column would be highly undesirable because it is a highly conspicuous location in the passenger compartment of the vehicle.

BRIEF SUMMARY OF THE INVENTION

In view of such problems of the prior art, a primary object of the present invention is to provided a selector device for an automatic transmission system which is compact in size and small in weight.

A second object of the present invention is to provide a selector device which is suitable for use in a column shift type selector lever for an automatic transmission system which is durable in use.

A third object of the present invention is to provide a selector device which is suitable for use in a column shift type selector lever for an automatic transmission system which is simple in structure, and economical to fabricate.

These and other objects of the present invention can be accomplished by providing a selector device for an automatic transmission system, comprising: a base bracket; a rotatable member mounted on the base bracket so as to be rotatable around a first pivot shaft; a fork member mounted on the rotatable member so as to be tiltable around a second pivot shaft extending substantially perpendicularly to the first pivot shaft, and provided with a first end which is bifurcated on a plane substantially perpendicular to the second pivot shaft into a first engagement claw and a second engagement claw defining a gap therebetween, and a second end to which a base end of a selector lever is fixedly secured; a checker cam securely attached to the base bracket and extending along a path of movement of the gap between the engagement claws defined as the rotatable member rotates around the first pivot shaft, the checker cam being provided with a cam surface opposing the first engagement claw and extending along a path of movement of the first engagement claw defined as the rotatable member rotates around the first pivot shaft, the cam surface including a recess corresponding to a park range position of the selector lever and a raised part provided adjacent to the recess; a slide member which can be selectively placed in an engagement position located between the second engagement claw and a part of the checker cam opposing the second engagement claw, and a release position not interfering with a movement of the second engagement claw resulting from the tilting movement of the fork member around the second pivot shaft; an actuator for selectively moving the slide member between the engagement position and the release position; and spring means for normally urging the first engagement claw toward the cam surface of the checker cam; the recess and the gap between the first and second engagement claws being so dimensioned that the first engagement claw is received in the recess when the selector lever is shifted to the park range position, and that the first engagement claw is prevented from going over the raised part when the slide member is in the engagement position and the selector lever is attempted to be moved out of the park range position by tilting the selector lever against a spring force of the spring means, and the first engagement claw is allowed to be moved over the raised part when the slide member is in the release position and the selector lever is attempted to be moved out of the park range position by tilting the selector lever against a spring force of the spring means. Typically, the base bracket is provided with a guide groove for guiding the slide member between the engagement position and the release position along a direction extending substantially along a path of movement of the second engagement claw defined as the rotatable member is rotated around the first pivot shaft.

Thus, when an attempt is made to shift the selector lever from the park range position without properly releasing the slide member which is typically associated with a shift lock mechanism, the movement of the selector lever is restrained by the slide member inserted between the second engagement claw and the checker cam, and the force applied to the selector lever is supported by the slide member as a compressive load. No stress is applied to the actuator or the linkage provided between the actuator and the slide member.

Therefore, the various components forming the shift lock mechanism or other component parts provided in association with the slide member are not subjected to any large stress, and may consist of relatively small members.

According to a preferred embodiment of the present invention, the actuator consists of a linear actuator having a working end, and a linear movement of the working end is transmitted to an end of the slide member via a bell crank member pivotably supported by the base bracket, the bell crank and the slide member being linked with each other via a pin and slot coupling structure including a slot extending substantially perpendicularly to the direction of movement of the slide member. According to this embodiment, the actuator is protected from any external force even when there is some play in the guide for the sliding movement of the slide member.

Furthermore, the base bracket may be adapted to be mounted on a side of a steering column, and the linear actuator may extend substantially horizontally above or below the steering column, the first pivot shaft extending substantially in parallel with the steering column. This structure is particularly advantageous in implementing the present invention as a column shift type selector lever mechanism. However, it should be noted that the present invention is not limited to such a column shift type selector lever mechanism in its application, but also may be applied to selector lever mechanisms which are adapted to be mounted on a dashboard panel. It is also possible to apply the present invention to stick shift type selector lever mechanisms.

According to the preferred embodiment of the present invention in which the slide member is so positioned that the slide member can be moved out of the engagement position by the second engagement claw as the selector lever is shifted toward the park range position, and the first engagement claw is moved toward the recess of the cam surface of the checker cam, once the selector lever is shifted out of the park range position, even though the actuator is not kept operative, the slide member can be moved out of the way of the second claw member, and is allowed to be moved between different speed range positions other than the park range position, and shifted back to the park range position.

A detent mechanism is normally required in a selector lever mechanism, and the rotatable member may be provided with a wavy detent cam surface which forms a detent mechanism in cooperation with a resilient cam follower member extending from the base bracket. Thus, the detent mechanism can be provided in a compact manner. Furthermore, a limit switch may be mounted on the base bracket for detecting a shifting of the selector lever to the park range position by being actuated by either one of the engagement claws. Thus, the shifting of the selector lever to the park range position can be detected in a reliable manner because the detection is effected by directly detecting the movement of the fork member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
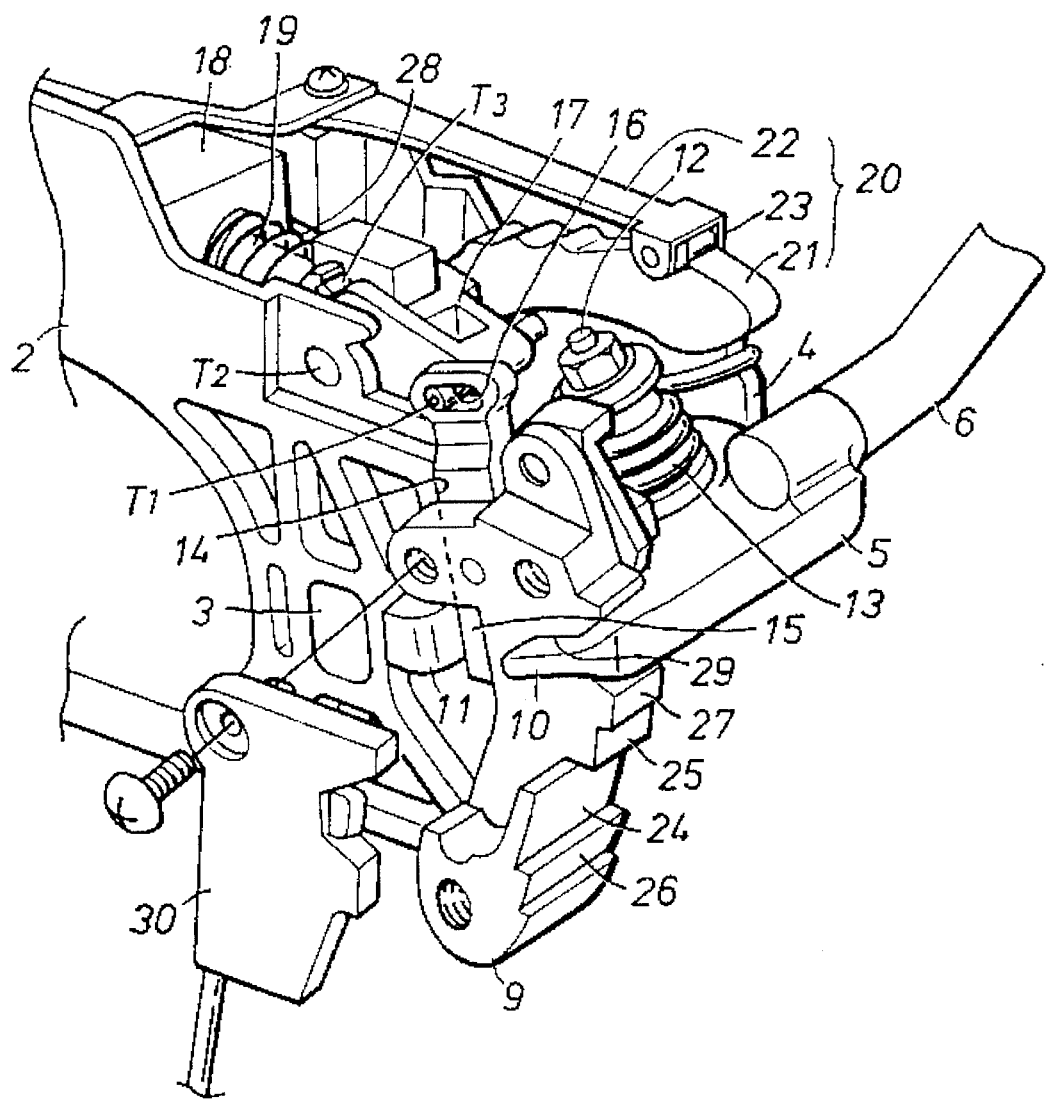
FIG. 1 is a perspective view of an essential part of the selector device for an automatic transmission system according to the present invention.
Figure 2:
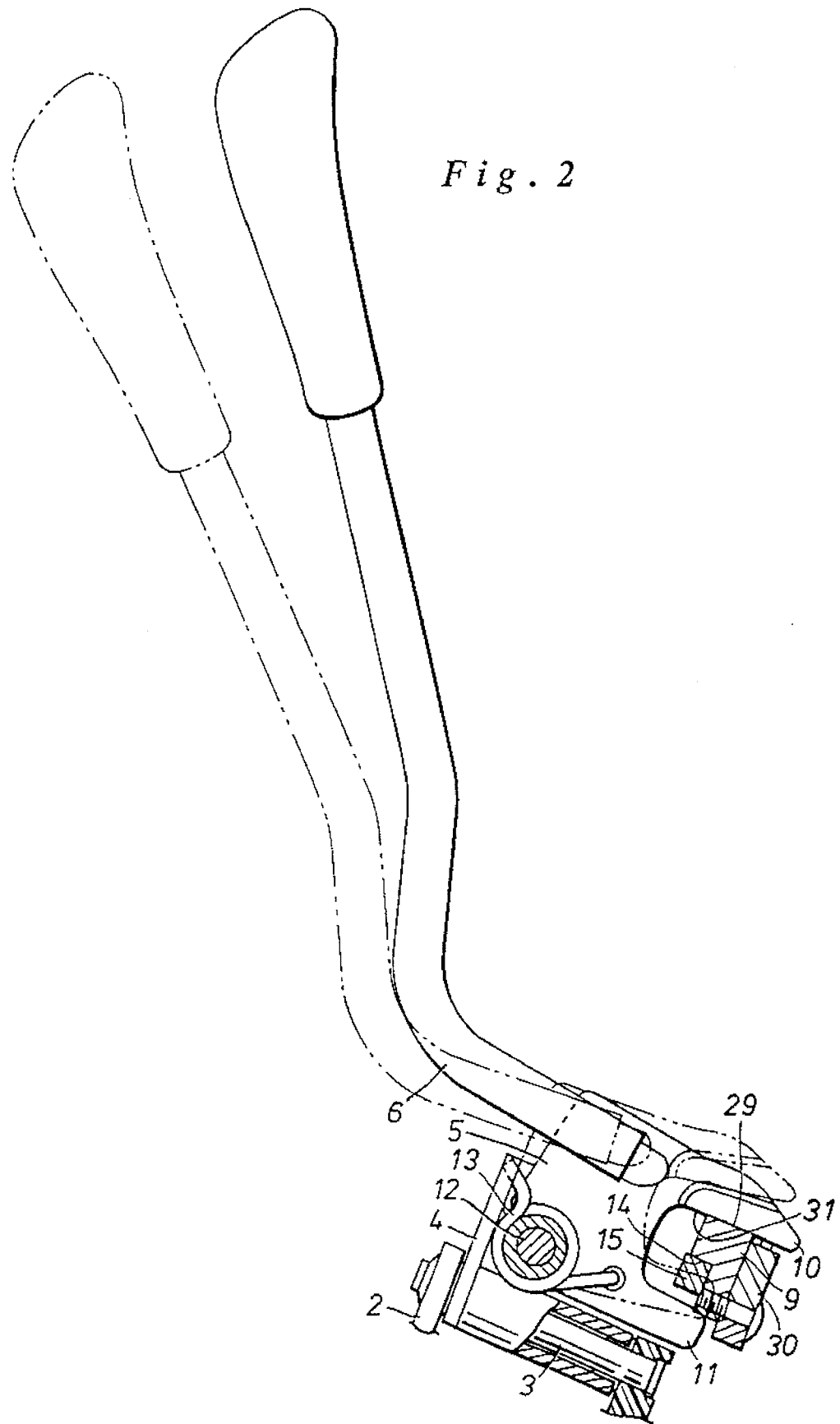
FIG. 2 is a fragmentary sectional view of the selector device taken across the axial center line of the steering column.
Figure 3:
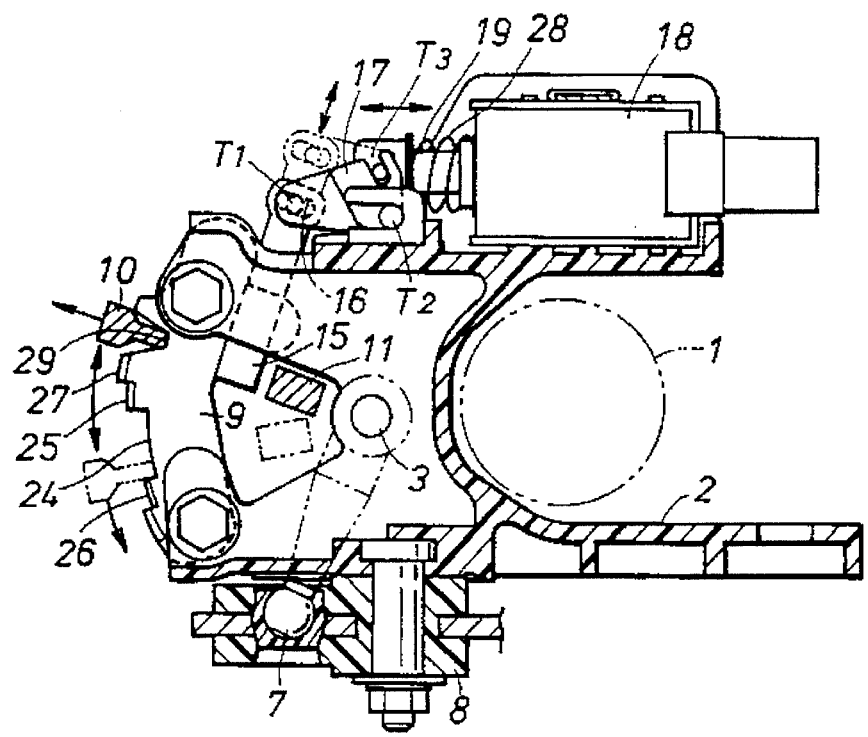
FIG. 3 is a bottom view of the fork member locking mechanism with a part thereof shown in section.
Figure 4:
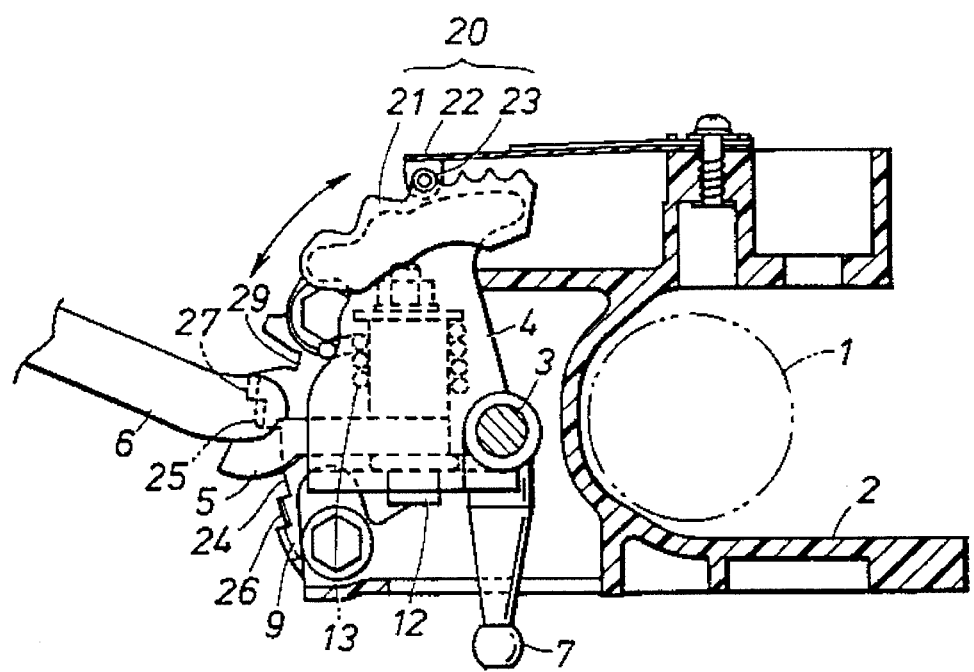
FIG. 4 is a bottom view of the detent mechanism with a part thereof shown in section.

FIGS. 1 to 4 show an essential part of a column shift type selector device for an automatic transmission system constructed according to the present invention. This selector device comprises a rotatable member 4 pivotably supported by a base bracket 2, fixedly secured to a steering column 1, via a first pivot shaft 3 extending in parallel with the axial line of the steering column 1, a fork member 5 which is tiltably supported by the rotatable member 4 around a second shaft 12 extending perpendicular to the axial line of the first pivot shaft 3, and a selector lever 6 fixedly secured to the fork member 5. A ball stud 7 extending from the rotatable member 4 transmits the movement of the selector lever 6 to a manual valve (not shown in the drawings) of a torque converter via a linkage mechanism 8 such as a bell crank.

An arcuate checker cam 9 is fixedly secured to an axial end surface of the base bracket 2, and provided a irregular cam surface for preventing the movement of the selector lever 6 from one of the range positions to another. The fork member 5 is provided with a pair of engagement claws 10 and 11 defining a gap 31 between them and receiving the checker cam 9 in this gap 31, and is urged by a torsion coil spring 13 wound around the second pivot shaft 12 in the direction to engage one of the engagement claws 10 with the irregular cam surface of the checker cam 9.

The base bracket 2 is provided with a guide groove 14 extending in parallel with the second pivot shaft 12 of the fork member 5 in a part thereof adjacent to the checker cam 9, and a stopper key or a slide member 15 is slidably received in this guide groove 14.

A laterally extending slot 16 is provided in an upper end of the slider member 15, and a pin extending from a first corner T1 of a triangular member 17 is received in this slot 16. A pin extending from a second corner T2 of the triangular member 17 is pivotably supported by the base bracket 2, and a third corner T3 of the triangular member 17 is coupled to a working end of a plunger member 19 projecting from a solenoid 18. Thus, the triangular member 17 serves as a bell crank for transmitting the force produced by the solenoid 18 to the slide member 15.

The other axial end surface of the base bracket 2 is provided with a detent mechanism 20 for providing a stepwise movement of the selector lever 6. The detent mechanism 20 comprises a detent cam 21 fixedly attached to the rotatable member 4 and provided with a wavy cam surface on an outer circumferential surface thereof, and a cam follower or a roller 23 resiliently supported by the base bracket 2 by means of a sheet spring 22 and engages the recesses provided in the wavy cam surface of the detent cam 21.

The cam surface of the checker cam 9 includes a base surface 24 corresponding to N, D4 and D3 which is more recessed than adjacent parts, and a pair of intermediate raised parts 25 and 26 corresponding to the transitions from N to R and from D3 to 2 and located on either side of the base surface 24. An even more raised part 27 corresponding to the transition from R to P is provided next to one of the intermediate raised parts 25. Because the first engagement claw 10 of the fork member 5 is normally urged into engagement with the cam surface of the checker cam 9, the selector lever 6 can be moved freely between N, D4 and D3, but cannot be moved from N to R or from D3 to 2 with the first engagement claw 10 engaged by the raised parts 25 and 26 of the cam surface of the checker cam 9. In other words, the first engagement claw 10 cannot be moved over the raised parts 25 and 26 as long as it moves along the surface of the outer contour of the base surface 24 of the cam surface corresponding to N, D4 and D3. By pulling the selector lever 6 along the axial line of the steering column or toward the vehicle operator against the spring force of the torsion coil spring 13 urging the fork member 5, the first engagement claw 10 can now be moved over the raised potions 25 and 26, and the selector lever 6 can be moved from N to R or from D3 to 2. Likewise, by pulling the selector lever 6 toward the vehicle operator, the engagement claw 10 can be also moved over the raised part 27, and the selector lever 6 can be moved to the P range position in which the first engagement claw 10 is received in a recess 29 provided in a part of the cam surface of the checker cam 9 adjacent to the raised part 27.

When the vehicle is in stationary condition, the selector lever 6 is in the P range, and the solenoid 10 is in de-energized condition. The plunger member 19 of the solenoid 18 is normally urged in the projecting direction by a return spring 28 surrounding the plunger member 19, and the slide member 15 is therefore pushed between the second engagement claw 11 of the fork member 5 and the checker cam 9 by way of the triangular member 17. Because the recess 29 corresponding to the P range position is more recessed than the raised parts 27 and 29, the selector lever 6 is required to be more tilted toward the vehicle operator to allow the first engagement claw 10 to be able to ride over the raised part 27, and the selector lever 6 to be moved out of the P range. However, when the slide member 15 is inserted between the second engagement claw 11 and the checker cam 9, the selector lever 6 cannot be sufficiently tilted to be allowed to be shifted out of the P range position.

When the solenoid 18 is energized, and the plunger member 19 is retracted into the solenoid, this movement is transmitted to the triangular member 17 which in turn rotates upward around the third corner T3 thereof. As a result, the slide member 15 is moved out of the moveable range of the second engagement claw 11, and the selector lever 6 is now allowed to be shifted out of the P range position. Therefore, by synchronizing the energization of the solenoid 18 with the pressing of the brake pedal, it is possible to allow the selector lever 6 to be shifted out of the P range position only when the brake pedal is pressed.

The slide member 15 is inserted between the checker cam 9 and the engagement claw of the fork member 5 under the spring force of the return spring 28 when the solenoid 18 is de-energized, and, therefore, the selector lever 6 normally cannot be shifted out of the P range position. However, when the selector lever 6 is shifted to the P range position from another range, the slide member 15 is pushed upward by being pushed by the second engagement claw 11, and would not interfere with the tilting movement of the fork member 5 and, hence, the shifting movement of the selector lever 6. Once the first engagement claw 10 of the selector lever 6 is received into the P position recess 29, the slide member 15 moves into the moveable range of the second engagement claw 11, and prevents the tilting movement of the fork member 5, thus preventing the shifting of the selector lever 6 out of the park range position.

When the selector lever 6 is shifted to the P range position, and the first engagement claw 10 of the selector lever 6 is received into the P position recess 29, the first engagement claw 10 pushes the contact of a limit switch 30 mounted on an end surface of the checker cam 9, and the shifting of the selector lever 6 to the P range can be detected with this limit switch 30. The output signal from this limit switch 30 may be used for energizing a lock solenoid of the ignition switch for preventing the starter key from being removed from the key hole unless the selector lever is placed in the park range position. Because the first engagement claw 10 directly actuates the limit switch 30, the activation of the lock solenoid can be accomplished in a reliable fashion. Obviously, it is also possible to actuate a similar limit switch with the second engagement claw instead of the first engagement claw.

Thus, according to the present invention, the actuator for the slide member, and the associated force transmitting linkage can be arranged in a highly compact fashion, and the force which may be applied to the selector lever would not be transmitted to them as it can be supported by the slide member as a compressive load which is directed perpendicularly to the direction of the movement of the slide member. Thus, the requirement of the mechanical strength of the various parts involved in the movement of the slide member is significantly reduced.

Additionally, the entire selector mechanism along with the selector lever locking mechanism can be conveniently mounted on a steering column without taking up much space, and the selector mechanism can be made highly durable against any force which may be applied to the selector lever.

Although the present invention has been described in terms of a preferred embodiment thereof, it is obvious to a person skilled in the art that various alterations and modifications are possible without departing from the scope of the present invention which is set forth in the appended claims.

What we claim is:

1. A selector device for an automatic transmission system, comprising:

a base bracket;

a rotatable member mounted on said base bracket so as to be rotatable around a first pivot shaft;

a fork member mounted on said rotatable member so as to be tiltable around a second pivot shaft extending substantially perpendicularly to said first pivot shaft, and provided with a first end which is bifurcated on a plane substantially perpendicular to said second pivot shaft into a first engagement claw and a second engagement claw defining a gap therebetween, and a second end to which a base end of a selector lever is fixedly secured;

a checker cam securely attached to said base bracket and extending along a path of movement of said gap between said engagement claws defined as said rotatable member rotates around said first pivot shaft, said checker cam being provided with a cam surface opposing said first engagement claw and extending along a path of movement of said first engagement claw defined as said rotatable member rotates around said first pivot shaft, said cam surface including a recess corresponding to a park range position of said selector lever and a raised part provided adjacent to said recess;

a slide member which can be selectively placed in an engagement position located between said second engagement claw and a part of said checker cam opposing said second engagement claw, and a release position not interfering with a movement of said second engagement claw resulting from said tilting movement of said fork member around said second pivot shaft;

an actuator for selectively moving said slide member between said engagement position and said release position; and spring means for normally urging said first engagement claw toward said cam surface of said checker cam;

said recess and said gap between said first and second engagement claws being so dimensioned that said first engagement claw is received in said recess when said selector lever is shifted to said park range position, and that said first engagement claw is prevented from going over said raised part when said slide member is in said engagement position and said selector lever is attempted to be moved out of said park range position by tilting said selector lever against a spring force of said spring means, and said first engagement claw is allowed to be moved over said raised part when said slide member is in said release position and said selector lever is attempted to be moved out of said park range position by tilting said selector lever against a spring force of said spring means.

2. A selector device according to claim 1, wherein said base bracket is provided with a guide groove for guiding said slide member between said engagement position and said release position along a direction extending substantially along a path of movement of said second engagement claw defined as said rotatable member is rotated around said first pivot shaft.

3. A selector device according to claim 2, wherein said actuator consists of a linear actuator having a working end, and a linear movement of said working end is transmitted to an end of said slide member via a bell crank member pivotably supported by said base bracket, said bell crank and said slide member being linked with each other via a pin and slot coupling structure including a slot extending substantially perpendicularly to said direction of movement of said slide member.

4. A selector device according to claim 3, wherein said slide member is so positioned that said slide member can be moved out of said engagement position by said second engagement claw as said selector lever is shifted toward said park range position, and said first engagement claw is moved toward said recess of said cam surface of said checker cam.

5. A selector device according to claim 1, wherein said rotatable member is provided with a wavy detent cam surface which forms a detent mechanism in cooperation with a resilient cam follower member extending from said base bracket.

6. A selector device according to claim 1, wherein a limit switch is mounted on said base bracket for detecting a shifting of said selector lever to said park range position by being actuated by said first engagement claw.

7. A selector device according to claim 1, wherein said base bracket is adapted to be mounted on a side of a steering column, and said linear actuator extends substantially horizontally above or below said steering column, said first pivot shaft extending substantially in parallel with said steering column.

* * * * *